US012058278B2

(12) United States Patent
Jo et al.

(10) Patent No.: US 12,058,278 B2
(45) Date of Patent: Aug. 6, 2024

(54) ELECTRONIC DEVICE INCLUDING LIQUID CRYSTAL FOR REFLECTING LIGHT OF DESIGNATED WAVELENGTH

(71) Applicant: Samsung Electronics Co., Ltd., Suwon-si (KR)

(72) Inventors: Jeonggyu Jo, Suwon-si (KR); Bokyung Sim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 735 days.

(21) Appl. No.: 17/274,125

(22) PCT Filed: Aug. 27, 2019

(86) PCT No.: PCT/KR2019/010934
§ 371 (c)(1),
(2) Date: Mar. 5, 2021

(87) PCT Pub. No.: WO2020/050538
PCT Pub. Date: Mar. 12, 2020

(65) Prior Publication Data
US 2022/0417353 A1    Dec. 29, 2022

(30) Foreign Application Priority Data
Sep. 7, 2018    (KR) .................. 10-2018-0107309

(51) Int. Cl.
*H04M 3/00*    (2024.01)
*G02F 1/1335*    (2006.01)
(Continued)

(52) U.S. Cl.
CPC .... *H04M 1/0266* (2013.01); *G02F 1/133553* (2013.01); *H01Q 1/243* (2013.01); *H04M 2201/36* (2013.01); *H04M 2250/22* (2013.01)

(58) Field of Classification Search
CPC ........... H04M 1/0266; H04M 2201/36; H04M 2250/22; G02F 1/133553; H01Q 1/243
(Continued)

(56) References Cited

U.S. PATENT DOCUMENTS 5,566,010 A * 10/1996 Ishii ..................... G09G 3/3607
345/88
6,697,129 B1 * 2/2004 Nishi .................. G02F 1/13725
349/33
(Continued)

FOREIGN PATENT DOCUMENTS

KR    20050066217 A    6/2005
KR    10-1195472 B1    11/2012
(Continued)

OTHER PUBLICATIONS

Decision of Patent dated Jul. 3, 2023, in connection with counterpart Korean Application No. 10-2018-0107309, 14 pages.
(Continued)

*Primary Examiner* — William J Deane, Jr.

(57) ABSTRACT

Various embodiments of the present invention relate to an electronic device including a liquid crystal, the electronic device including: a piece of glass; a display disposed under a first region of the piece of glass; a power supplying module; one or more electrode films; and one or more liquid crystal layers disposed between the one or more electrode films. The electronic device may also include: a light reflection member (e.g., cholesteric liquid crystal) disposed under a second region of the piece of glass; a processor operatively connected to the display, the power supplying module, and the light reflection member; and a memory operatively connected to the processor. The processor can check the content to be displayed through the display, and can use the power supplying module to supply power to the light reflection member on the basis of at least the checked (Continued)

content, so that the one or more liquid crystal layers reflects at least a portion of light incident from the outside of the electronic device. In addition, other embodiments are possible.

14 Claims, 16 Drawing Sheets

(51) Int. Cl.
*H01Q 1/24* (2006.01)
*H04M 1/02* (2006.01)

(58) Field of Classification Search
USPC .......................................... 379/330, 374.03
See application file for complete search history.

(56) References Cited

U.S. PATENT DOCUMENTS

| 2002/0057239 | A1* | 5/2002 | Hiji ...................... G09G 3/3625 |
| | | | 345/87 |
| 2009/0102770 | A1* | 4/2009 | Iwata ...................... G09G 3/36 |
| | | | 345/89 |
| 2010/0073343 | A1* | 3/2010 | Shingai ................ G09G 3/3629 |
| | | | 345/95 |
| 2010/0225853 | A1 | 9/2010 | Wang et al. |
| 2011/0141390 | A1 | 6/2011 | Lee et al. |
| 2012/0092600 | A1* | 4/2012 | Kurosaki ............ G02F 1/13471 |
| | | | 349/115 |
| 2017/0097541 | A1 | 4/2017 | Kim et al. |
| 2017/0237842 | A1 | 8/2017 | Fan |
| 2017/0285849 | A1 | 10/2017 | Kim et al. |
| 2017/0307817 | A1 | 10/2017 | Huang et al. |

FOREIGN PATENT DOCUMENTS

| KR | 10-2016-0029443 A | 3/2016 |
| KR | 10-1668269 B1 | 10/2016 |
| KR | 20170041330 A | 4/2017 |
| KR | 20170065657 A | 6/2017 |
| KR | 10-2017-0100736 A | 9/2017 |

OTHER PUBLICATIONS

International Search Report dated Dec. 4, 2019 in connection with International Patent Application No. PCT/KR2019/010934, 2 pages.
Written Opinion of the International Searching Authority dated Dec. 4, 2019 in connection with International Patent Application No. PCT/KR2019/010934, 5 pages.
Decision of Patent issued Jan. 8, 2024, in connection with Korean Patent Application No. 10-2018-0107309, 7 pages.

* cited by examiner

ELECTRONIC DEVICE INCLUDING LIQUID CRYSTAL FOR REFLECTING LIGHT OF DESIGNATED WAVELENGTH

CROSS-REFERENCE TO RELATED APPLICATIONS

This application is a 371 of International Application No. PCT/KR2019/010934 filed on Aug. 27, 2019, which claims priority to Korean Patent Application No. 10-2018-0107309 filed on Sep. 7, 2018, the disclosures of which are herein incorporated by reference in their entirety.

BACKGROUND

1. Field

Various embodiments of the disclosure relate to an electronic device including a liquid crystal configured to reflect light having a designated wavelength. An electronic device according to various embodiments of the disclosure may be an electronic device in which, when a condition for changing the color of the liquid crystal is satisfied, the color of the liquid crystal is changed by reflecting light having a wavelength corresponding to the condition.

2. Description of Related Art

A portable electronic device, the exterior color of which is determined as a single color, may be designed and manufactured based on the determined color. Due to the development of technology, the front portion of a portable electronic device may be generally configured with a display that displays a screen. In a portable electronic device, an area occupied by a display is getting larger, and areas other than the area occupied by the display (e.g., a bezel and a piece of back glass) are getting smaller. The designs of the front portions of portable electronic devices may generally take a form occupied by a display, and the designs of the front portions of all the portable electronic devices may be quite similar to each other. The external color of a portable electronic device may be fixed to one color (e.g., black).

In order to change the exterior color of a portable electronic device, a cholesteric liquid crystal may be used. A cholesteric liquid crystal is a liquid crystal in which liquid crystal molecules of a nematic liquid crystal are twisted in a spiral shape, and the reflection and transmission properties of light may be controlled depending on a spiral pitch. For example, light corresponding to a predetermined wavelength band may be selectively reflected in response to the spiral pitch of liquid crystal molecules, which are twisted and oriented. For example, by reflecting at least a part of light corresponding to red by the aligned liquid crystal molecules, the cholesteric liquid crystal may be displayed in red. In the cholesteric liquid crystal, the spiral pitches of the liquid crystal molecules may be set differently for respective pixels, and various colors may be displayed by adjusting the reflection wavelength band.

An electronic device may include at least one component (e.g., a camera, an infrared sensor, a proximity sensor, or a speaker) on a front portion, and the background color of the at least one component may be made black so as to lower visibility of the at least one component. For this reason, the front portions of electronic devices may be generally displayed in black, and the designs of the front portions of most electronic devices may be similar to each other.

An electronic device according to various embodiments of the disclosure may be provided with a liquid crystal that reflects light having a designated wavelength (e.g., a cholesteric liquid crystal) under a piece of glass (e.g., a piece of front glass or a piece of rear glass), whereby the color displayed on the exterior of the electronic device may be variously set. In the electronic device according to various embodiments, a set voltage may be applied to the cholesteric liquid crystal, and the cholesteric liquid crystal may reflect at least a part of the light such that the color is displayed differently in response to the applied voltage.

SUMMARY

An electronic device according to various embodiments of the disclosure may include: a piece of glass; a display disposed under a first area of the glass; a power supply module; a light reflection member including one or more electrode films, and one or more liquid crystal layers disposed between the one or more electrode films, the light reflection member being disposed under a second area of the glass; a processor operatively connected to the display, the power supply module, and the light reflection member; and a memory operatively connected to the processor. The processor may be configured to: identify a content to be displayed through the display; and supply power to the light reflection member using the power supply module in order to cause the one or more liquid crystal layers to reflect at least a part of light incident from the outside of the electronic device based on at least the identified content.

An electronic device according to various embodiments of the disclosure may include: a piece of glass; a display disposed under a first area of the glass; a power supply module; and a light reflection member disposed under a second area of the glass corresponding to a remaining area other than the first area in the glass. The light reflection member may include one or more electrode films and one or more liquid crystal layers disposed between the one or more electrode films, power may be supplied to correspond to the one or more liquid crystal layers via the power supply module, and at least a part of light incident from an outside of the electronic device may be reflected in response to the supplied power.

An electronic device according to various embodiments of the disclosure may include: a piece of glass; a display disposed under the glass; a power supply module; and a light reflection member disposed between the glass and the display. The light reflection member may include one or more electrode films and one or more liquid crystal layers disposed between the one or more electrode films, power may be supplied to correspond to the one or more liquid crystal layers via the power supply module, and at least a part of light incident from an outside of the electronic device may be reflected in response to the supplied power.

An electronic device according to various embodiments of the disclosure has a built-in liquid crystal (e.g., a cholesteric liquid crystal) configured to reflect light having a designated wavelength. Thus, it is possible for the electronic device to selectively reflect at least a part of light based on the cholesteric liquid crystal. In the color change mode of the electronic device, a set voltage can be supplied to the display for color change, and at least a part of the light having the designated wavelength can be reflected in response to the set voltage. The cholesteric liquid crystal may be disposed under (on the bottom surface of) the glass of the electronic device, and a voltage can be applied via an integrated circuit of the display panel. The cholesteric liquid crystal is capable of reflecting at least a part of a light source in response to the applied voltage, and the appearance color of the electronic device may be determined based on the reflected light source. In the electronic device, different colors can be set based on the cholesteric liquid crystal, which may differentiate the design of the electronic device from the designs of other electronic devices.

DETAILED DESCRIPTION

Figure 1:
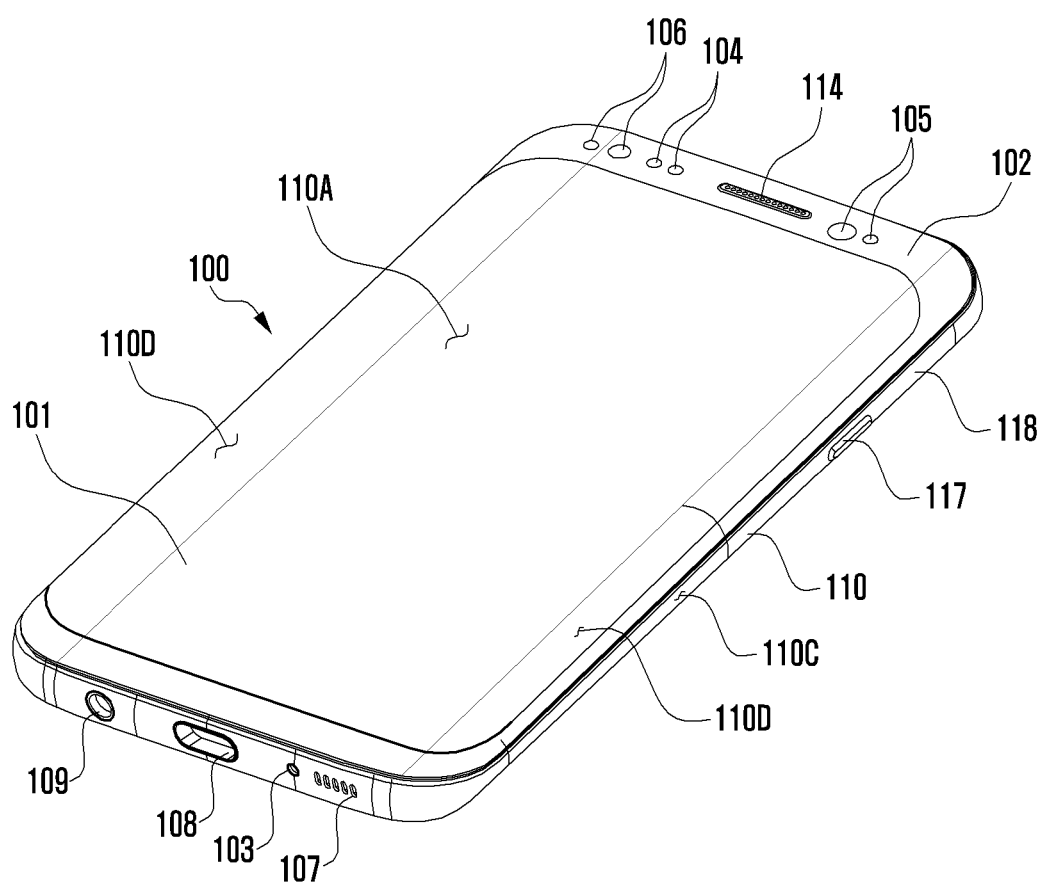
FIG. 1 is a perspective view of the front surface of a mobile electronic device according to an embodiment.
Figure 2:
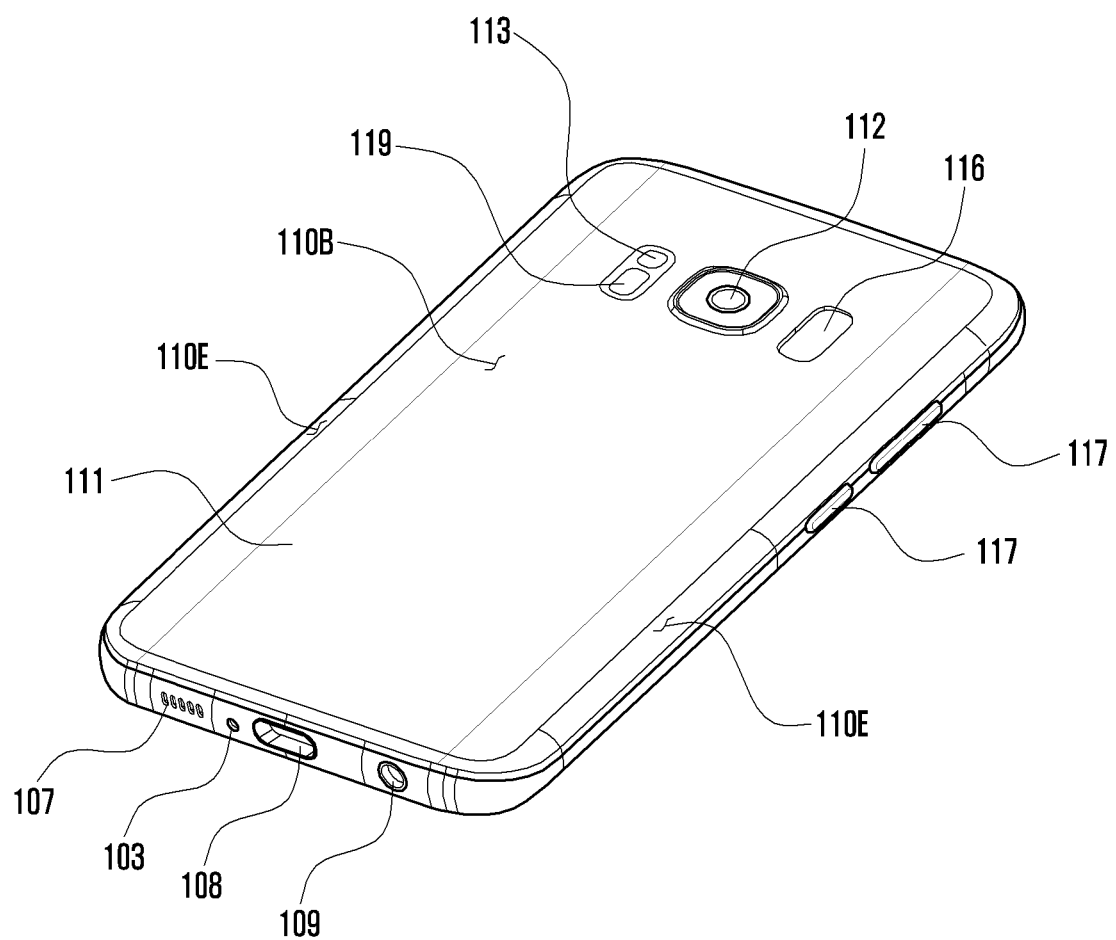
FIG. 2 is a perspective view of the rear surface of the electronic device of FIG. 1.

Referring to FIG. 1 and FIG. 2, an electronic device 100 according to an embodiment may include a housing 110 including a first surface (or front surface) 110A, a second surface (or rear surface) 110B, and a side surface 110C surrounding the space between the first surface 110A and the second surface 110B. In another embodiment (not illustrated), the housing may denote a structure that forms a part of the first surface 110A, the second surface 110B, and the side surface 110C illustrated in FIG. 1. According to an embodiment, the first surface 110A may be formed by a front plate 102, at least a part of which is substantially transparent (for example, a glass plate including various coating layers, or a polymer plate). The second surface 110B may be formed by a rear plate 111 that is substantially opaque. The rear plate 111 may be made of coated or colored glass, ceramic, polymer, metal (for example, aluminum, stainless steel (STS), or magnesium), or a combination of at least two of the above-mentioned materials. The side surface 110C may be formed by a side bezel structure (or "side member") 118 which is coupled to the front plate 102 and to the rear plate 111, and which includes metal and/or polymer. In some embodiments, the rear plate 111 and the side bezel structure 118 may be formed integrally and may include the same material (for example, a metal material such as aluminum). According to an embodiment, at least one of the first surface 110A, the second surface 110B, and the side surface 110C may include a cholesteric liquid crystal built therein, and the color of at least one of the first surface 110A, the second surface 110B, and the side surface 110C may be set based on the cholesteric liquid crystal. The cholesteric liquid crystal is a liquid crystal in which liquid crystal molecules are oriented in a spiral shape, and light reflection and transmission properties may be set differently depending on a spiral pitch. Accordingly, the cholesteric liquid crystal may reflect at least a part of light, and various colors may be visually displayed to correspond to the reflected light. The cholesteric liquid crystal may at least partially reflect light having a designated wavelength in response to the applied voltage, and a displayed color may be determined based on the reflected light.

In the illustrated embodiment, the front plate 102 may include two first areas 110D on both ends of the long edge of the front plate 102 such that the two first areas 110D bend from the first surface 110A toward the rear plate 111 and extend seamlessly. In the illustrated embodiment (see FIG. 2), the rear plate 111 may include two second areas 110E on both ends of the long edge such that the two second areas 110E bend from the second surface 110B toward the front plate 102 and extend seamlessly. In some embodiments, the front plate 102 (or the rear plate 111) may include only one of the first areas 110D (or the second areas 110E). In another embodiment, a part of the first areas 110D or the second areas 110E may not be included. In the above embodiments, when seen from the side surface of the electronic device 100, the side bezel structure 118 may have a first thickness (or width) on a part of the side surface, which does not include the first areas 110D or the second areas 110E as described above, and may have a second thickness that is smaller than the first thickness on a part of the side surface, which includes the first areas 110D or the second areas 110E.

According to an embodiment, the electronic device 100 may include at least one of a display 101, audio modules 103, 107, and 114, sensor modules 104, 116, and 119, camera modules 105, 112, and 113, a key input device 117, a light-emitting element 106, and connector holes 108 and 109. In some embodiments, at least one of the constituent elements (for example, the key input device 117 or the light-emitting element 106) of the electronic device 100 may be omitted, or the electronic device 100 may additionally include another constituent element.

The display 101 may be exposed through a corresponding part of the front plate 102, for example. In some embodiments, at least a part of the display 101 may be exposed through the front plate 102 that forms the first areas 110D of the side surface 110C and the first surface 110A. In some embodiments, the display 101 may have a corner formed in substantially the same shape as that of the adjacent outer periphery of the front plate 102. In another embodiment (not illustrated), in order to increase the area of exposure of the display 101, the interval between the outer periphery of the display 101 and the outer periphery of the front plate 102 may be formed to be substantially identical.

In another embodiment (not illustrated), a recess or an opening may be formed in a part of the screen display area of the display 101, and at least one of an audio module 114, a sensor module 104, a camera module 105, and a light-emitting element 106 may be included and aligned with the recess or the opening. In another embodiment (not illustrated), on the back surface of the screen display area of the display 101, at least one of an audio module 114, a sensor module 104, a camera module 105, a fingerprint sensor 116 (for example, biometric sensor), and a light-emitting element 106 may be included. In another embodiment (not illustrated), the display 101 may be coupled to or arranged adjacent to a touch sensing circuit, a pressure sensor capable of measuring the intensity (pressure) of a touch, and/or a digitizer that detects a magnetic field-type stylus pen. In some embodiments, at least a part of the sensor modules 104 and 119 and/or at least a part of the key input device 117 may be arranged in the first areas 110D and/or the second areas 110E.

The audio modules 103, 107, and 114 may include a microphone hole 103 and speaker holes 107 and 114. A microphone for acquiring an external sound may be arranged in the microphone hole 103, and a plurality of microphones may be arranged therein such that the direction of a sound can be sensed in some embodiments. The speaker holes 107 and 114 may include an outer speaker hole 107 and a speech receiver hole 114. In some embodiments, the speaker holes 107 and 114 and the microphone hole 103 may be implemented as a single hole, or a speaker may be included (for example, a piezoelectric speaker) without the speaker holes 107 and 114.

The sensor modules 104, 116, and 119 may generate an electric signal or a data value corresponding to the internal operating condition of the electronic device 100 or the external environment condition thereof. The sensor modules 104, 116, and 119 may include, for example, a first sensor module 104 (for example, a proximity sensor) arranged on the first surface 110A of the housing 110, and/or a second sensor module (not illustrated) (for example, a fingerprint sensor), and/or a third sensor module 119 (for example, an HRM sensor) arranged on the second surface 110B of the housing 110, and/or a fourth sensor module 116 (for example, a fingerprint sensor). The fingerprint sensor may be arranged not only on the first surface 110A (for example, the display 101) of the housing 110, but also on the second surface 110B thereof. The electronic device 100 may further include a sensor module not illustrated, for example, at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or a luminance sensor 104.

The camera modules 105, 112, and 113 may include a first camera device 105 arranged on the first surface 110A of the electronic device 100, a second camera device 112 arranged on the second surface 110B thereof, and/or a flash 113. The camera devices 105 and 112 may include a single lens or a plurality of lenses, an image sensor, and/or an image signal processor. The flash 113 may include, for example, a light-emitting diode or a xenon lamp. In some embodiments, two or more lenses (an infrared camera, a wide-angle lens, and a telephoto lens) and image sensors may be arranged on a single surface of the electronic device 100.

The key input device 117 may be arranged on the side surface 110C of the housing 110. In another embodiment, the electronic device 100 may not include a part of the above-mentioned key input device 117 or the entire key input device 117, and the key input device 117 (not included) may be implemented in another type, such as a soft key, on the display 101. In some embodiments, the key input device may include a sensor module 116 arranged on the second surface 110B of the housing 110.

The light-emitting element 106 may be arranged on the first surface 110A of the housing 110, for example. The light-emitting element 106 may provide information regarding the condition of the electronic device 100 in a light type, for example. In another embodiment, the light-emitting element 106 may provide a light source that interworks with operation of the camera module 105, for example. The light-emitting element 106 may include, for example, an LED, an IR LED, and a xenon lamp.

The connector holes 108 and 109 may include a first connector hole 108 capable of containing a connector (for example, a USB connector) for transmitting/receiving power and/or data to/from an external electronic device, and/or a second connector hole (for example, an earphone jack) 109 capable of containing a connector for transmitting/receiving an audio signal to/from the external electronic device.

Figure 3:
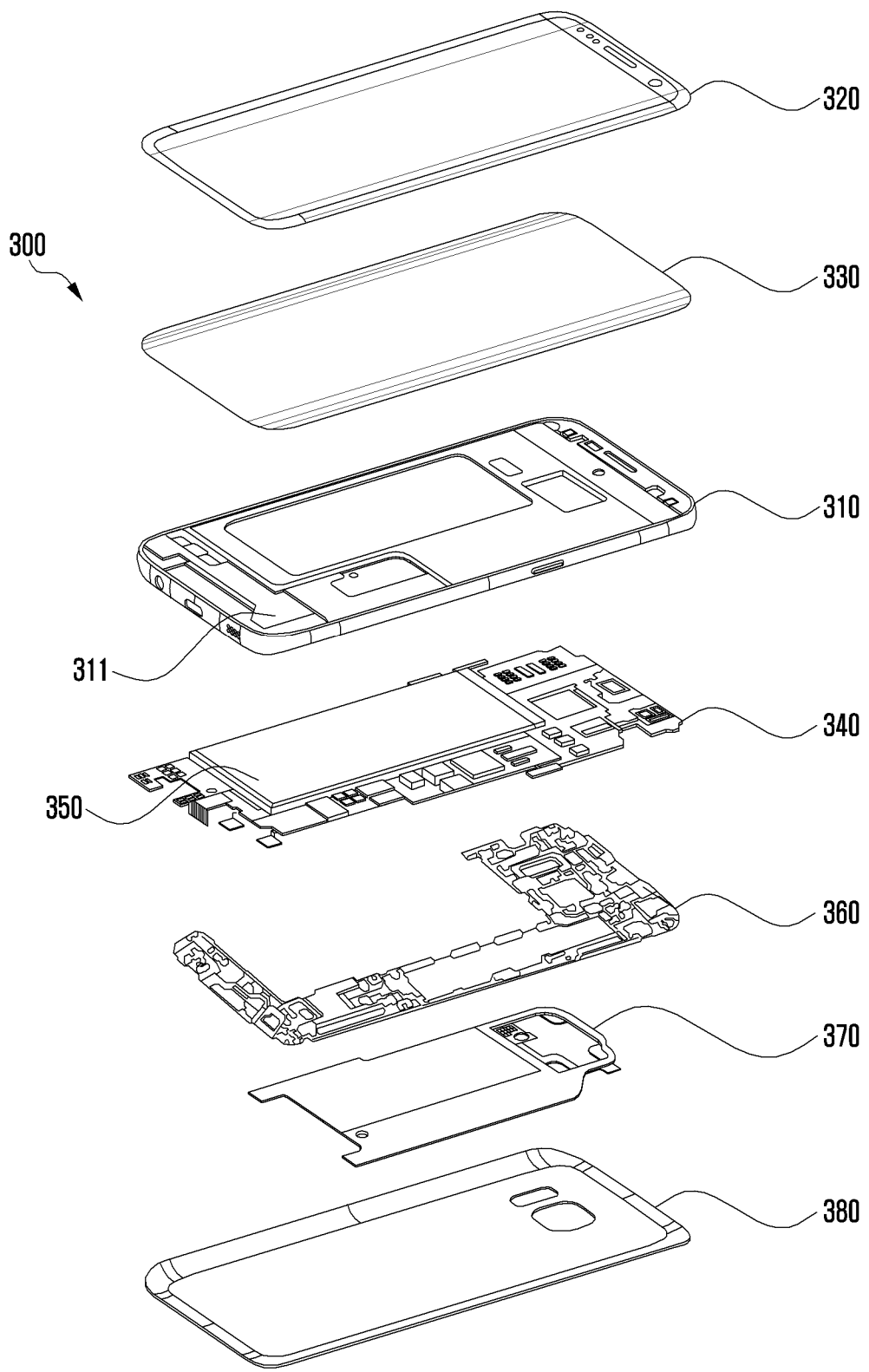
FIG. 3 is a developed perspective view of the electronic device of FIG. 1.
Figure 4D:
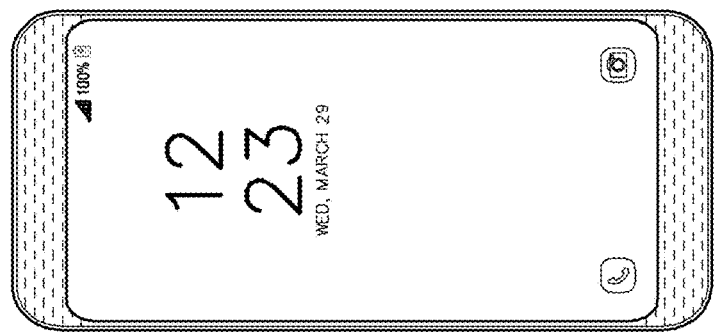
FIGS. 4A, 4B, 4C, 4D, 4E, 4F, 4G, and 4H are views illustrating an embodiment in which a light reflection member (e.g., a cholesteric liquid crystal) is at least partially included in the front and rear portions of an electronic device according to various embodiments of the disclosure, and the color of the electronic device is changed based on the cholesteric liquid crystal.
Figure 4C:
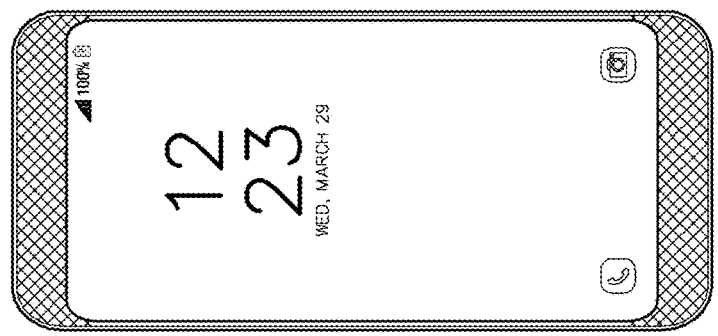
Figure 4B:
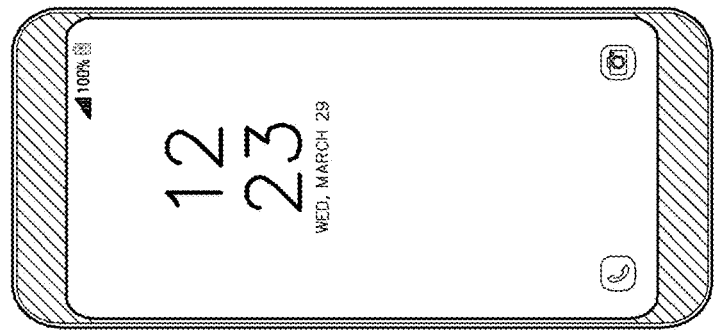
Figure 4A:
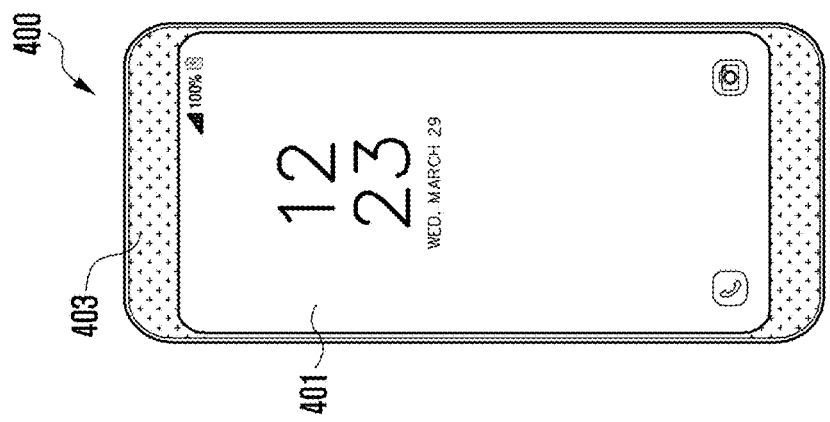
Figure 4H:
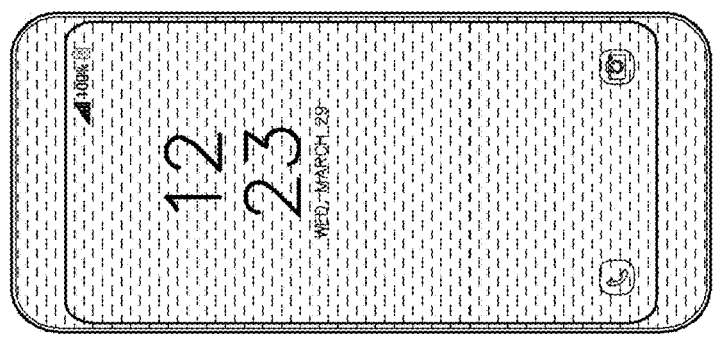
Figure 4G:
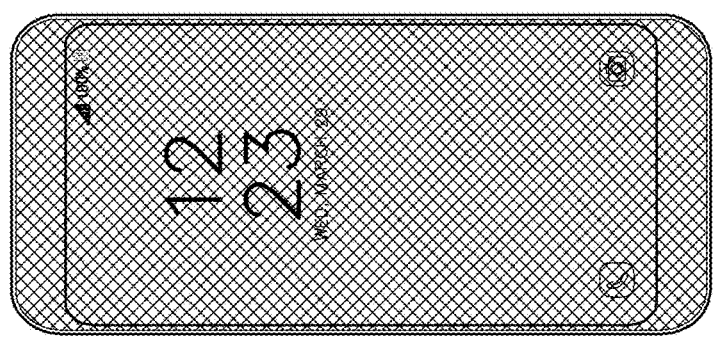
Figure 4F:
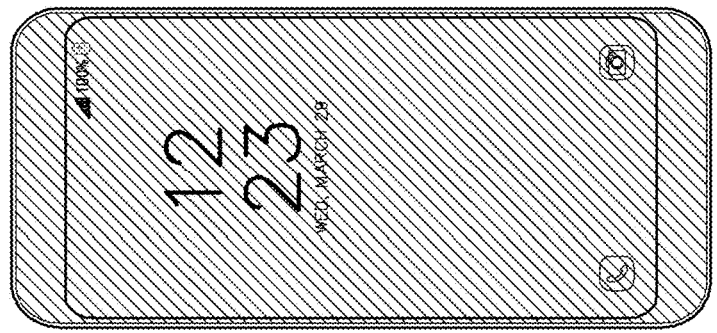
Figure 4E:
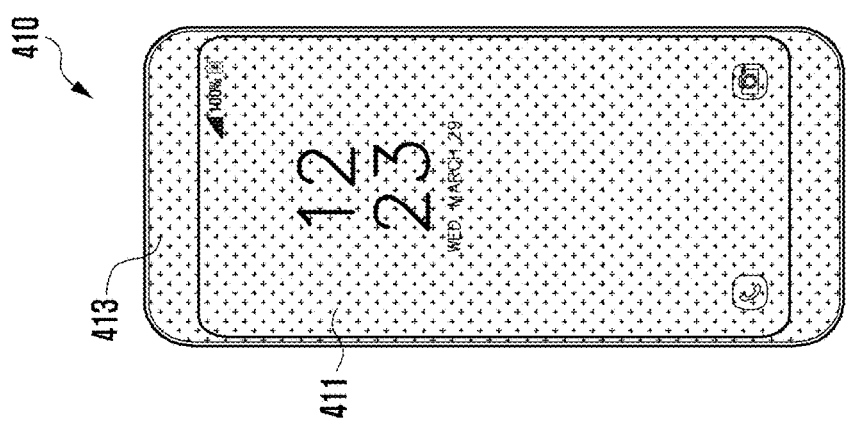

Referring to FIG. 3, the electronic device 300 may include a side bezel structure 310, a first support member 311 (for example, a bracket), a front plate 320, a display 330, a printed circuit board 340, a battery 350, a second support member 360 (for example, a rear case), an antenna 370, and a rear plate 380. According to an embodiment, the front plate 320 may include a piece of front glass, and the rear plate 380 may include a piece of rear glass. In some embodiments, at least one of the constituent elements (for example, the first support member 311 or the second support member 360) of the electronic device 300 may be omitted, or the electronic device 300 may further include another constituent element. At least one of the constituent elements of the electronic device 300 may be identical or similar to at least one of the constituent elements of the electronic device 100 of FIG. 1 or FIG. 2, and repeated descriptions thereof will be omitted herein.

The first support member 311 may be arranged inside the electronic device 300 and connected to the side bezel structure 310, or may be formed integrally with the side bezel structure 310. The first support member 311 may be made of a metal material and/or a nonmetal (for example, polymer) material, for example. The display 330 may be coupled to one surface of the first support member 311, and the printed circuit board 340 may be coupled to the other surface thereof. A processor, a memory, and/or an interface may be mounted on the printed circuit board 340. The processor may include, for example, one or more of a central processing device, an application processor, a graphic processing device, an image signal processor, an sensor hub processor, or a communication processor.

The memory may include a volatile memory or a non-volatile memory, for example.

The interface may include, for example, a high definition multimedia interface (HDMI), a universal serial bus (USB) interface, an SD card interface, and/or an audio interface. The interface may connect the electronic device 300 with an external electronic device electrically or physically, for example, and may include a USB connector, an SD card/MMC connector, or an audio connector.

The battery 350 is a device for supplying power to at least one constituent element of the electronic device 300, and may include a non-rechargeable primary cell, a rechargeable secondary cell, or a fuel cell, for example. At least a part of the battery 350 may be arranged on substantially the same plane with the printed circuit board 340, for example. The battery 350 may be arranged integrally inside the electronic device 300, or may be arranged such that the same can be attached to/detached from the electronic device 300.

The antenna 370 may be arranged between the rear plate 380 and the battery 350. The antenna 370 may include, for example, a near field communication (NFC) antenna, a wireless charging antenna, and/or a magnetic secure transmission (MST) antenna. The antenna 370 may conduct near-field communication with an external device or may wirelessly transmit/receive power necessary for charging, for example. In another embodiment, an antenna structure may be formed by a part or a combination of the side bezel structure 310 and/or the first support member 311.

According to various embodiments, a cholesteric liquid crystal may be mounted on one surface of the front glass included in the front plate 320 or on one surface of the rear glass included in the rear plate 380. Based on the cholesteric liquid crystal, the color of the front portion (e.g., the front plate 320) or the rear portion (e.g., the rear plate 380) of the electronic device 300 may be at least partially changed.

FIGS. 4A, 4B, 4C, 4D, 4E, 4F, 4G, and 4H are views each illustrating an embodiment in which a cholesteric liquid crystal is at least partially included in the front and rear portions of an electronic device according to various embodiments of the disclosure, and the color of the electronic device is changed based on the cholesteric liquid crystal.

Referring to FIGS. 4A to 4D, four embodiments of the front portion 403 (e.g., the front plate 102 in FIG. 1) of an electronic device 400 (e.g., the electronic device 100 of FIG. 1) are illustrated. The electronic device 400 may include a light reflection member at least partially built therein to correspond to at least one of the front surface, the side surface, and the rear surface thereof, and the light reflection member may reflect at least a part of light incident from the outside such that the color of the electronic device 400 is displayed differently. Hereinafter, the light reflection member may be referred to as a cholesteric liquid crystal.

According to an embodiment, the cholesteric liquid crystal may include a cholesteric film (e.g., a liquid crystal layer that reflects at least a part of light) divided into R (red), G (green), and B (blue) colors. In addition, one or more cholesteric films may be disposed in the form of being laminated under (e.g., on the bottom surface of) the glass (e.g., the front glass or the rear glass). For example, the embodiment of FIG. 4A may correspond to an embodiment in which the front portion 403 of the electronic device 400 is transparently displayed based on a cholesteric liquid crystal including a transparent cholesteric film. The embodiment of FIG. 4B may correspond to an embodiment in which the front portion 403 of the electronic device 400 is displayed in red based on a cholesteric liquid crystal including a cholesteric film corresponding to red. The embodiment of FIG. 4C may correspond to an embodiment in which the front portion 403 of the electronic device 400 is displayed in green based on a cholesteric liquid crystal including a cholesteric film corresponding to green. The embodiment of FIG. 4D may correspond to an embodiment in which the front portion 403 of the electronic device 400 is displayed in green based on a cholesteric liquid crystal including a cholesteric film corresponding to green. According to an embodiment, the electronic device 400 may be set to reflect at least a part of light such that a visually specific color is displayed. Although not illustrated, the electronic device 400 may include a cholesteric liquid crystal under the glass or the rear portion (e.g., the rear glass), and at least a part of light may be reflected such that the color of the electronic device 400 is displayed differently based on the cholesteric liquid crystal.

The front portion 403 of the electronic device 400 may include a display 401 (e.g., the display 101 in FIG. 1), and the cholesteric liquid crystal may be disposed to correspond to the front portion 403 excluding the display 401 area.

Referring to FIGS. 4E-4H, four embodiments of the front portion 413 (e.g., the front plate 102 in FIG. 1) of an electronic device 410 (e.g., the electronic device 100 of FIG. 1) are illustrated. The electronic device 400 may have a built-in cholesteric liquid crystal corresponding to at least one of the front surface, the side surface, and the rear surface thereof. For example, the cholesteric liquid crystal may be disposed to correspond to the entire area of the front portion 413 of the electronic device 410, and may reflect at least a part of light so as to display a specific color to correspond to the entire area of the front portion 413.

According to various embodiments, in the electronic device 410, at least a part of light may be reflected such that a specific color is displayed to correspond to at least one of the front surface, the side surface, and the rear surface, regardless of whether the display 411 (e.g., the display 101 is FIG. 1) is activated.

Figure 5A:
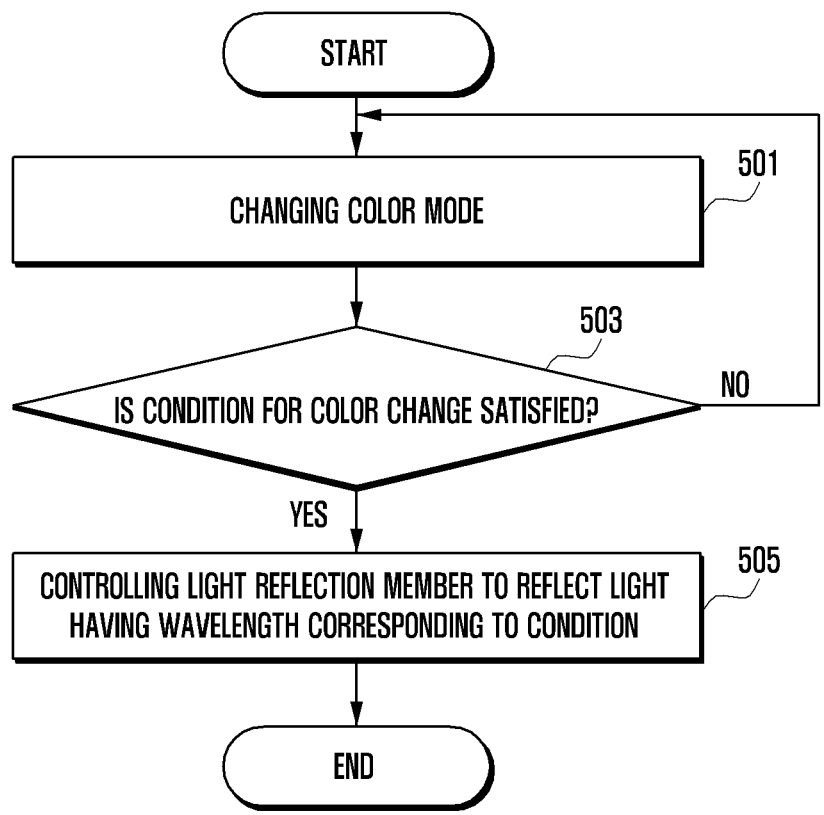
FIGS. 5A and 5B are flowcharts illustrating a method of changing the color of an electronic device by reflecting at least a part of light according to various embodiments of the disclosure.
Figure 5B:
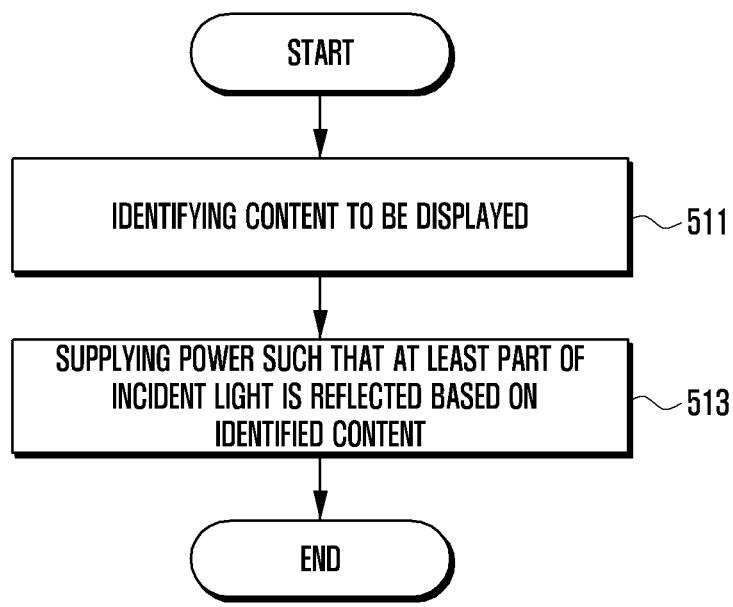

FIGS. 5A and 5B are flowcharts illustrating a method of changing the color of an electronic device by reflecting at least a part of light according to various embodiments of the disclosure.

Referring to FIG. 5A, in operation 501, the processor of the electronic device (e.g., the electronic device 100 in FIG. 1) may identify a color change mode. For example, the electronic device 100 may be set to a color change mode by a user, and the processor may identify that the color change mode is set. The electronic device 100 may include a light reflection member (e.g., a cholesteric liquid crystal), which reflects at least a part of light. The electronic device 100 may be set to the color change mode in which the exterior color is changed, and the exterior color of the electronic device 100 may be changed by controlling the light reflection member. The processor of the electronic device 100 may identify whether the color change mode is activated.

In operation 503, in response to activation of the color change mode, the processor may determine whether a condition for color change is satisfied. For example, in the electronic device 100, at least one condition for color change may be set in advance, and when the at least one set condition is satisfied, the color of the electronic device 100 may be changed to a color corresponding to the condition. According to an embodiment, the at least one condition for color change may include at least one of display of a specific content, execution of a set program (e.g., an application), release of a sleep mode, provision of a notification in sleep mode, and activation of display. According to an embodiment, when a situation for displaying a specific content (e.g., a message, a phone call, or a notification) occurs, the processor may determine that the condition for color change is satisfied. For example, when receiving a message and a phone call or outputting a notification message and signal sound according to the set notification, the processor may determine that the condition for color change is satisfied. According to an embodiment, when the set program is executed (e.g., when a message is received through the set program), the processor may determine that the condition for color change is satisfied. According to an embodiment, when the sleep mode is released or the notification is provided in the sleep mode state, the processor may determine that the condition for color change is satisfied. According to an embodiment, when the display is activated, the processor may determine that the condition for color change is satisfied. For example, the electronic device 100 may be set by a user such that a specific color is displayed in the state in which the display is activated, and in response to the activation of the display, the processor of the electronic device 100 may apply a voltage or current corresponding to the display of the specific color to the light reflection member such that the specific color is displayed in the appearance of the electronic device 100. By applying the preset voltage or current to the light reflection member, a specific color may be displayed in the appearance of the electronic device 100.

According to various embodiments, in the electronic device 100, a content to be displayed (e.g., a message, a call, a missed call, a notification, execution of a specific program, release of a sleep mode, or activation of a display) may be identified, and the voltage of the power supply corresponding to the identified content may be determined. For example, a first color corresponding to message reception may be set, and in the electronic device 100, a first voltage corresponding to the first color may be applied to the light reflection member. In the electronic device 100, by applying the first voltage to the light reflection member, the first color may be displayed on the electronic device 100. In the electronic device 100, by applying the determined voltage to the light reflection member (e.g., the cholesteric liquid crystal), the light reflection member may be controlled to reflect at least a part of light corresponding to the voltage. When the light reflection member reflects at least a part of light, the color in the appearance of the electronic device 100 may be determined based on the reflection of light.

When the condition for color change is satisfied in operation 503, in operation 505, the processor may control the light reflection member to reflect light having a wavelength corresponding to the condition. According to an embodiment, the electronic device 100 may determine a voltage value or current value to be applied to the light reflection member in response to at least one condition. According to an embodiment, the electronic device 100 may apply the determined voltage value or current value to the light reflection member. According to an embodiment, the light reflection member may reflect light having a wavelength of a specific band in response to the voltage value or current value. By reflecting light having the wavelength of the specific band, at least one color may be displayed on the electronic device 100 based on the reflected light. For example, the processor of the electronic device 100 may change the color of a liquid crystal (e.g., a liquid crystal that reflects light having a designated wavelength or a cholesteric liquid crystal) in response to the reflected light.

When the condition for color change is not satisfied in operation 503, the processor returns to operation 501 so as to identify whether the color change mode of the electronic device 100 is activated.

FIG. 5B is a flowchart implementing an embodiment in which power is supplied to the light reflection member based at least on a content. FIG. 5B may be a flowchart illustrating operations 503 and 505 in FIG. 5A.

Referring to FIG. 5B, in operation 511, the processor of the electronic device (e.g., the electronic device 100 in FIG. 1) may identify a content to be displayed on the display (e.g., a message, a call, a missed call, a notification, execution of a specific program, release of a sleep mode, or activation of a display). The operation of identifying a content may be included in the operation of determining whether the condition for color change is satisfied in operation 503 of FIG. 5A.

In operation 513, the processor may supply power to the light reflection member so as to reflect at least a part of light incident from the outside based on the identified content. According to an embodiment, the processor may identify the set voltage corresponding to the checked content. For example, a voltage may be set in advance to correspond to the content, and information related to the set voltage corresponding to the content may be stored in the memory of the electronic device 100. The processor may supply power to the light reflection member (e.g., a cholesteric liquid crystal) based on the set voltage. According to an embodiment, the light reflection member to which the power is supplied may reflect at least a part of incident light based on the power. The light reflection member reflects at least a part of the light so that a specific color can be displayed on the electronic device 100.

Figure 6A:
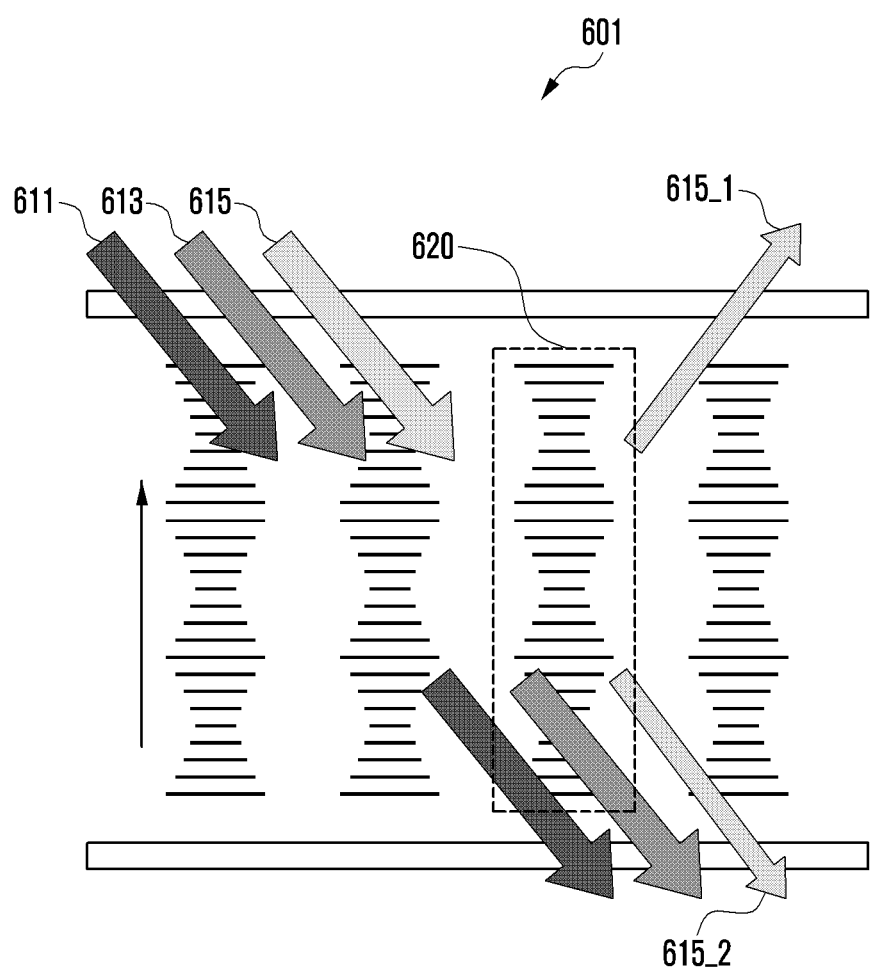
FIGS. 6A and 6B are views illustrating an embodiment in which at least a part of light is reflected based on a liquid crystal for reflecting light having a designated wavelength according to various embodiments of the disclosure.
Figure 6B:
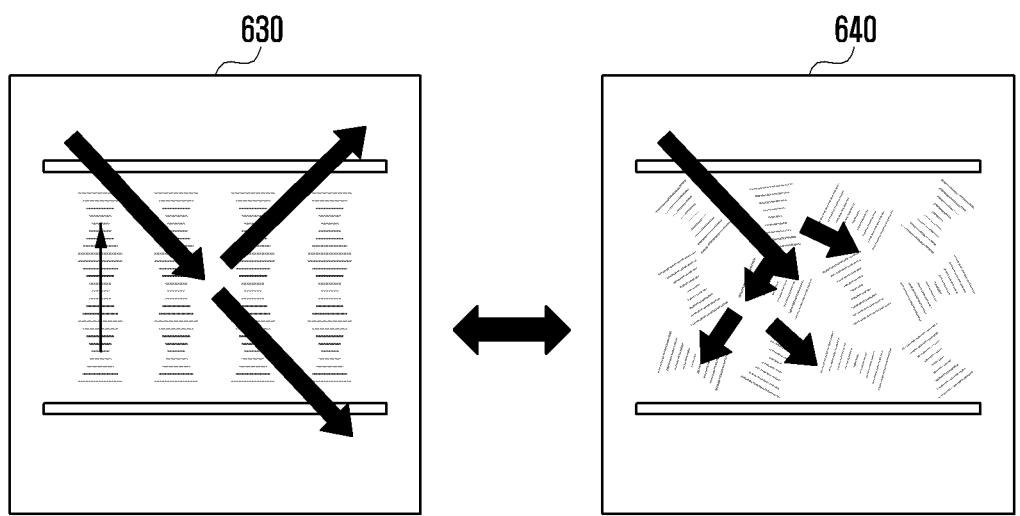

FIGS. 6A and 6B are views illustrating an embodiment in which at least a part of light is reflected based on a liquid crystal for reflecting light having a designated wavelength according to various embodiments of the disclosure.

Referring to FIG. 6A, a liquid crystal (e.g., a light reflection member or a cholesteric liquid crystal 601) for reflecting light having a designated wavelength may be a liquid crystal in which multiple liquid crystal molecules 620 are twisted in a spiral shape. The cholesteric liquid crystal 601 may determine the degree of reflection and the degree of transmission of light depending on spiral pitch. For example, the cholesteric liquid crystal 601 may include a cholesteric film corresponding to R (red), G (green), and B (blue), and may selectively reflect at least a part of light. Referring to FIG. 6A, when light (e.g., red light 611, green light 613, and blue light 615) is received, the cholesteric liquid crystal 601 may pass the red light 611 and the green light 613 as they are in response to the applied voltage, and may reflect at least a part 615_1 of the blue light 615 (of the blue light 615, the remaining 615_2, which is not reflected, may be passed). According to an exemplary embodiment, the cholesteric liquid crystal 601 reflects at least a part of light so that various colors can be displayed on the electronic device (e.g., the electronic device 100 in FIG. 1).

Referring to FIG. 6B, according to an embodiment, the cholesteric liquid crystal 630 to which a set voltage is applied may reflect at least a part of light corresponding to the set voltage. According to an embodiment, the cholesteric liquid crystal 630 may determine the color of the electronic device based on at least a part of the reflected light. According to another embodiment, the cholesteric liquid crystal 640 to which a set voltage is not applied may transmit or absorb at least a part of light, rather than reflecting the part. According to another embodiment, the cholesteric liquid crystal 640 may display a default color (e.g., black).

Figure 7:
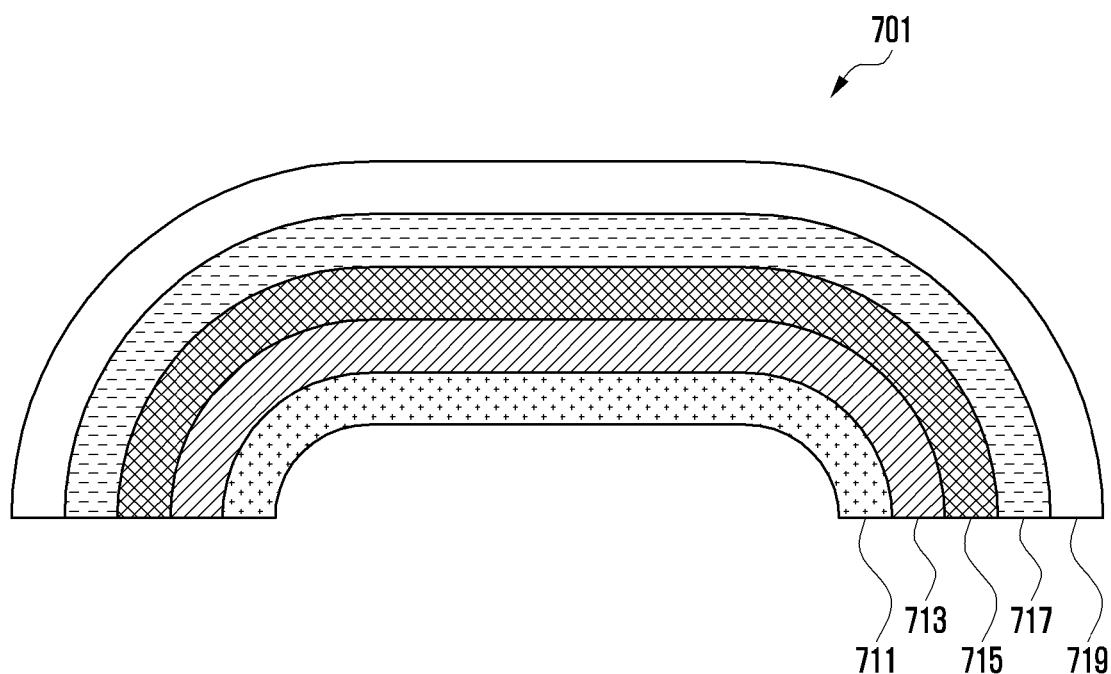
FIG. 7 is a view illustrating a structure of a cholesteric liquid crystal including one or more layers according to various embodiments of the disclosure.

FIG. 7 is a view 701 illustrating a structure of a cholesteric liquid crystal including one or more layers according to various embodiments of the disclosure.

Referring to FIG. 7, the cholesteric liquid crystal (e.g., a light reflection member) may include one or more layers (e.g., a cholesteric film, an electrode film, and an ITO film), and may be laminated under (e.g., on the bottom surface of) the glass (e.g., the front glass or the rear glass) of an electronic device (e.g., the electronic device 100 in FIG. 1). For example, the cholesteric liquid crystal may be laminated in the order of a black layer 711, a red layer 713, a green layer 715, and a blue layer 717, and a piece of glass 719 may be disposed above (e.g., on the top surface of) the blue layer 717. According to various embodiments, based on the one or more layers (e.g., the black layer 711, the red layer 713, the green layer 715, and the blue layer 717), the cholesteric liquid crystal may reflect at least a part of light in response to a voltage applied thereto. The cholesteric liquid crystal may display various colors in response to the voltage applied thereto. For example, the cholesteric liquid crystal may reflect at least a part of light corresponding to RGB colors based on the one or more layers.

FIGS. 8A, 8B, 8C, and 8D are views illustrating an arrangement structure of a cholesteric liquid crystal when the color of an electronic device is black or colored according to various embodiments of the disclosure.

Figures 8A, 8B:
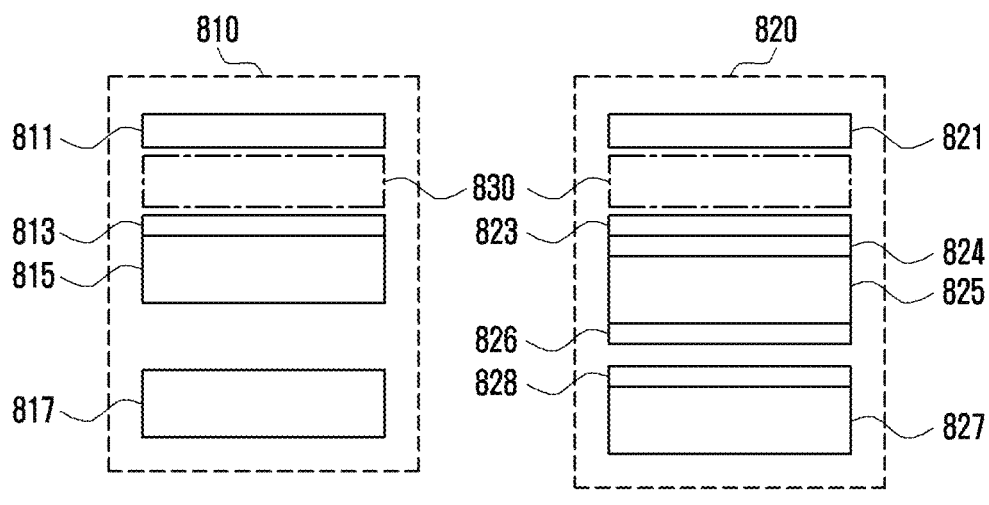
FIGS. 8A, 8B, 8C, and 8D are views illustrating an arrangement structure of a cholesteric liquid crystal when the color of an electronic device is black or colored according to various embodiments of the disclosure.

Referring to FIGS. 8A and 8B, the structure of FIG. 8A may be a laminated film structure 810 in the case where the color of the electronic device (e.g., the electronic device 100 in FIG. 1) is black, and the structure of FIG. 8B may be a laminated film structure 820 in the case where the color of the electronic device is colored.

For example, the film structure 810 of an electronic device having a black color may include an optically clear adhesive (OCA) film 813 and polyester (PET) film 815 disposed under a piece of glass 811. A film 817 printed in black may be disposed under the PET film 815.

For example, the film structure 820 of a colored electronic device may include an optically clear adhesive (OCA) film 823, a reflective/transparent deposition film 824, a PET film 825, and a color coating film 826 disposed under a piece of glass 821. A reflective metal deposition film 828 and a black printed film 827 may be disposed under the color coating film 826.

Referring to FIGS. 8A and 8B, a cholesteric liquid crystal 830 may be disposed between the glass 811 or 821 and the optically clear adhesive film 813 or 823. At least one film disposed under the optically clear adhesive film 813 or 823 may be included in a display panel (e.g., the display 101 in FIG. 1). According to various embodiments, the cholesteric liquid crystal 830 may be electrically connected to the display panel, and a voltage set based on the voltage applied to the display panel may be applied to the cholesteric liquid crystal 830.

Figure 8C:
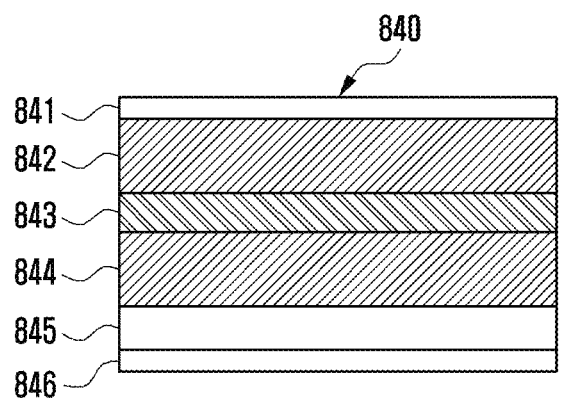
Figure 8D:
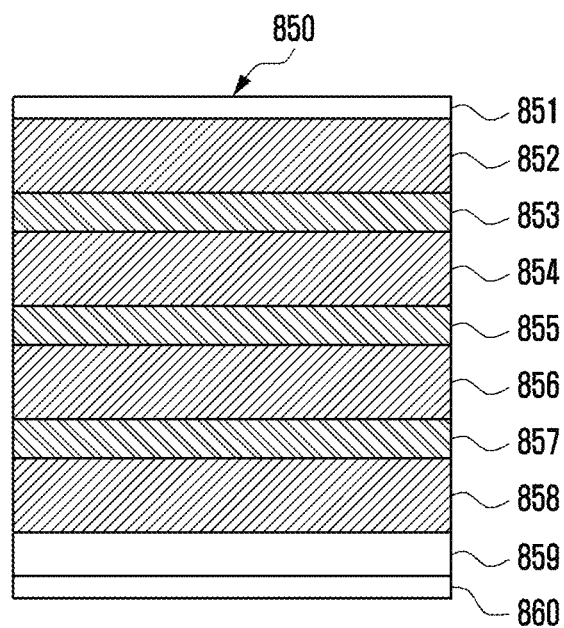

Referring to FIG. 8C, the structure of FIG. 8C may be a film structure 840 including a layer (e.g., a cholesteric film) in which a cholesteric liquid crystal corresponds to one color, and the structure of FIG. 8D may be a film structure 850 in which a cholesteric liquid crystal includes layers corresponding to three colors (e.g., R (red), G (green), and B (blue)).

Referring to the film structure 840 including a layer (e.g., a cholesteric film) corresponding to one color, the cholesteric liquid crystal may include electrode films (e.g., a first electrode film 842 and a second electrode film 844) (e.g., an indium-tin oxide (ITO) film, a phosphor-tin oxide film, and a transparent electrode film), and a cholesteric film 843. Each of the first electrode film 842 and the second electrode film 844 may have a thickness of about 23 μm, and the cholesteric film 843 may have a thickness of about 1 to 5 μm. The cholesteric liquid crystal displaying one color may be fabricated in a thickness of about 50 μm based on the first electrode film 842, the second electrode film 844, and the cholesteric film 843. According to an embodiment, the cholesteric liquid crystal may include a first electrode film 842, a second electrode film 844, and a single cholesteric film 843 disposed between the first electrode film 842 and the second electrode film 844. The cholesteric liquid crystal displaying one color may be fabricated in a thickness of about 50 μm based on the first electrode film 842, the second electrode film 844, and the cholesteric film 843. According to an embodiment, the film structure 840 displaying one color may include a cholesteric liquid crystal (e.g., the first electrode film 842, the cholesteric film 843, and the second electrode film 844) disposed between the glass 841 and the display panel 845 (e.g., the display panel in FIGS. 8A and 8B and FIGS. 8C and 8D), and a film 846 printed in black may be disposed under the display panel 845.

Referring to the film structure 850 including layers corresponding to three colors (e.g., R (red), G (green), and B (blue)), the cholesteric liquid crystal may include at least one electrode film (e.g., a first electrode film 852, a second electrode film 854, a third electrode film 856, or a fourth electrode film 858) (e.g., indium-tin oxide (ITO) film, phosphor-tin oxide film, or a transparent electrode film) and at least one cholesteric film (a first cholesteric film 853, a second cholesteric film 855, or a third cholesteric film 857). The at least one electrode film may have a thickness of about 23 μm, and the at least one cholesteric film may have a thickness of about 1 to 5 μm. According to an embodiment, the cholesteric liquid crystal may be formed in a structure in which one or more electrode films and one or more cholesteric film are sequentially one by one. For example, a first cholesteric film 853 may be disposed under the first electrode film 852, and a second electrode film 854 may be disposed under the first cholesteric film 853. The cholesteric liquid crystal may be formed in a structure in which one or more electrode films and one or more cholesteric film are alternately laminated one by one. The cholesteric liquid crystal displaying three colors may be fabricated in a thickness of about 110 μm based on at least one electrode film 852, 854, 856, or 858 and at least one cholesteric film 853, 855, and 857. According to an embodiment, the film structure 850 including the layers corresponding to the three colors may include a cholesteric liquid crystal (e.g., at least one electrode film 852, 854, 856, or 858 and at least one cholesteric film 853, 855, or 857) disposed between the glass 851 and the display panel 859 (e.g., the display panel in FIGS. 8A, 8B, 8C, and 8D), and a film 860 printed in black may be disposed under the display panel 859.

Figure 9:
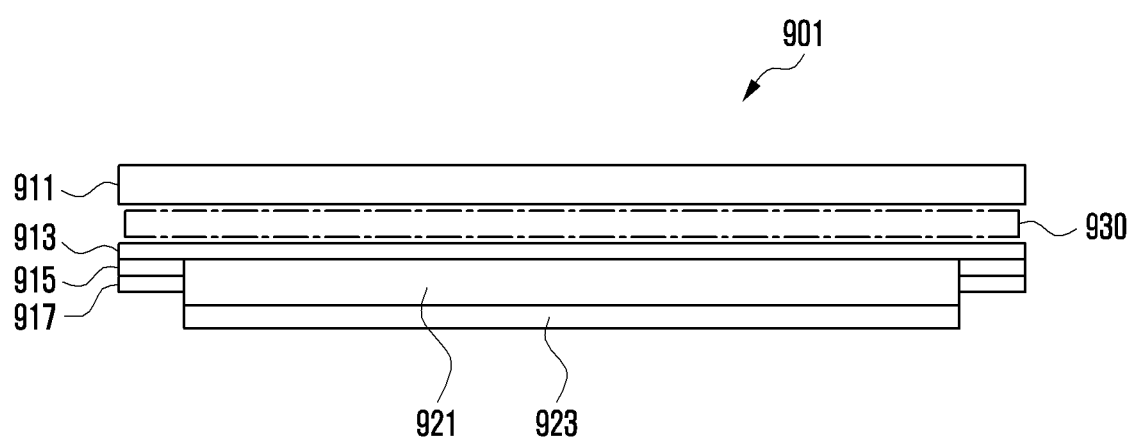
FIG. 9 is a cross-sectional view of an electronic device including a cholesteric liquid crystal according to various embodiments of the disclosure.

FIG. 9 is a cross-sectional view of an electronic device including a cholesteric liquid crystal according to various embodiments of the disclosure.

Referring to FIG. 9, a cross-sectional view obtained by at least partially cutting an electronic device 901 (e.g., the electronic device 100 in FIG. 1) is illustrated. In the electronic device 901, a piece of glass 911 (e.g., the front plate 102 in FIG. 1) may be disposed on (e.g., on the top surface of) a display 921 (e.g., the display 101 in FIG. 1), embossments and a cushion 923 may be disposed under (e.g., on the bottom surface of) the display 921 so as to mitigate an impact through the display 921. In the electronic device 801, a PET film 915 and a black printed film 917 may be disposed in an area other than the display 921 on which a screen is displayed.

According to various embodiments, a cholesteric liquid crystal 930 may be disposed between the glass 911 and the display 921. The cholesteric liquid crystal 930 may be attached based on an optically clear adhesive (OCA) film 913. According to various embodiments, the cholesteric liquid crystal 930 may be electrically connected to a power supply based on the display 921, and a set voltage may be applied to the cholesteric liquid crystal via the power supply. The cholesteric liquid crystal 930 may display a color corresponding to the set voltage in response to the application of the voltage.

Figure 10A:
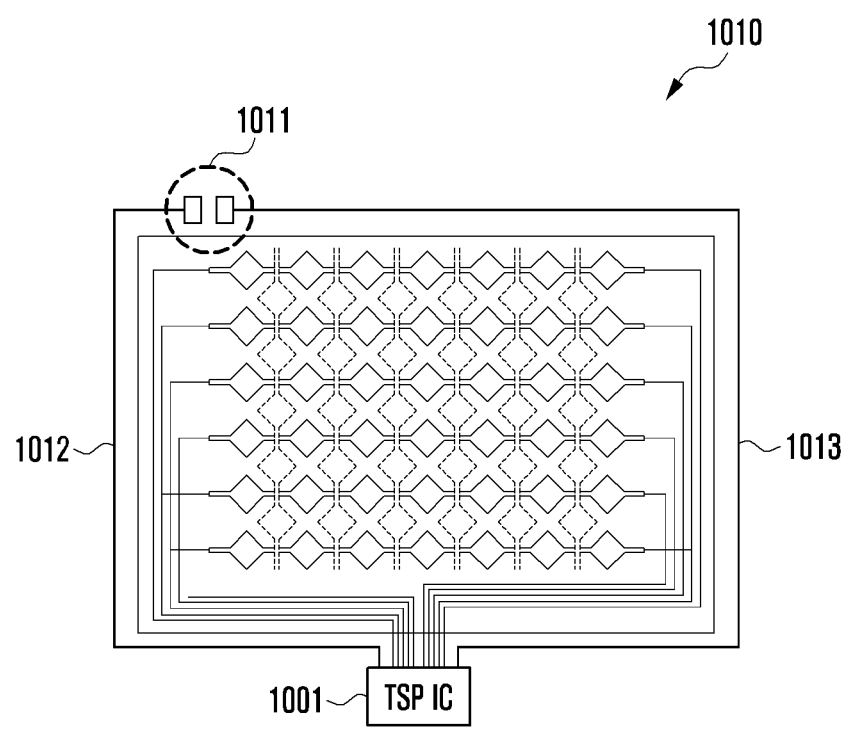
FIGS. 10A and 10B are views illustrating an embodiment in which a voltage is applied to a cholesteric liquid crystal based on a touch screen panel (TSP) according to various embodiments of the disclosure.
Figure 10B:
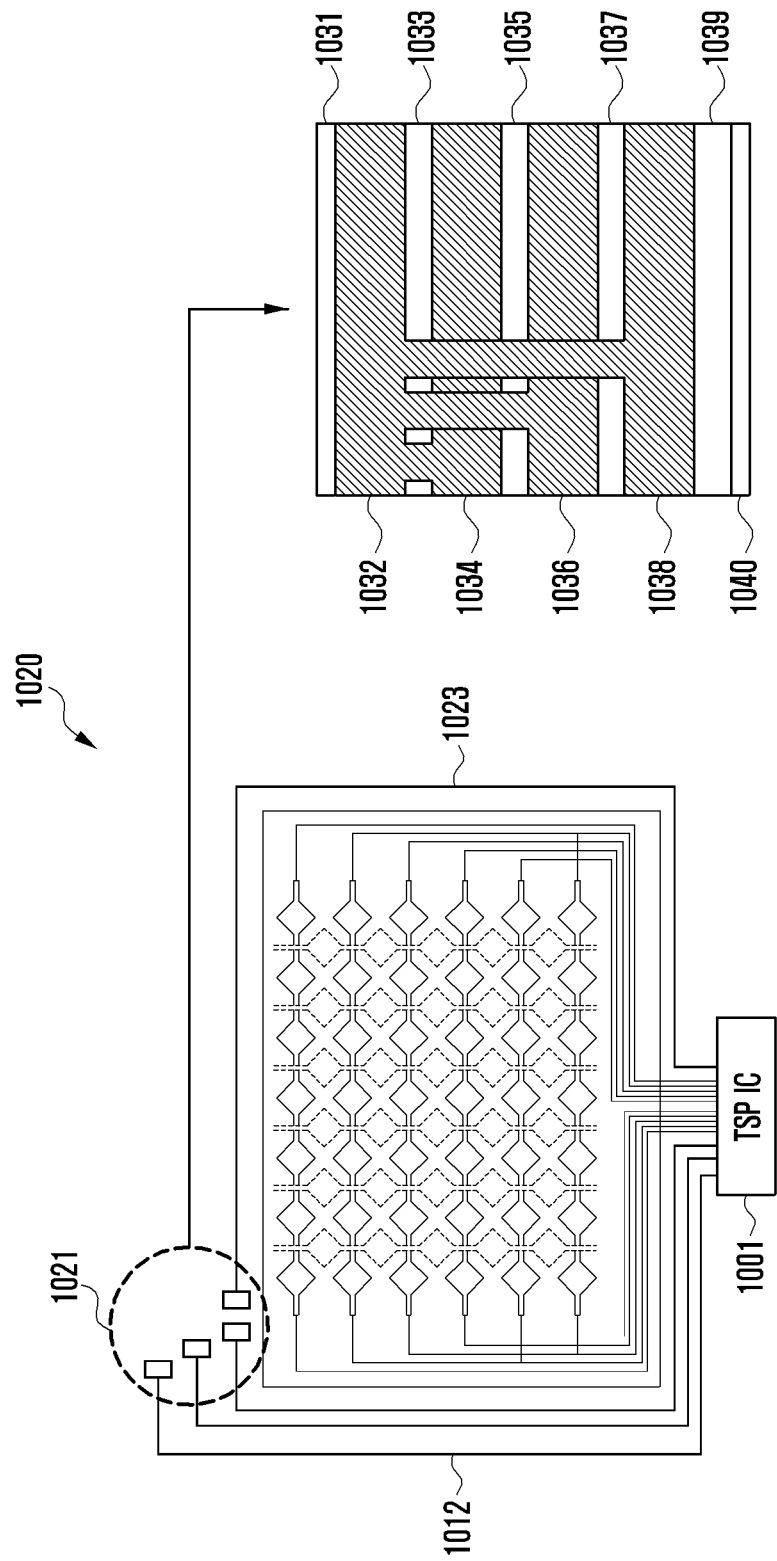

FIGS. 10A and 10B are views illustrating an embodiment of applying a voltage to a cholesteric liquid crystal based on a touch screen panel (TSP) according to various embodiments of the disclosure.

Referring to FIG. 10A, a pattern and wiring structure 1010 of a touch screen panel (e.g., the display 101 in FIG. 1) configured to apply a voltage to a cholesteric liquid crystal corresponding to one color is illustrated. The touch screen panel may include a touch screen panel integrated circuit (TSP IC) 1001, and may receive power from the touch screen panel integrated circuit (TSP IC) 1001. According to various embodiments, the cholesteric liquid crystal may be electrically connected to the touch screen panel integrated circuit 1001 via the power supply module 1011 (e.g., a power feeding terminal), and may receive power from the touch screen panel integrated circuit 1001. For example, the cholesteric liquid crystal may transmit a signal to the touch screen panel integrated circuit 1001 based on a transmission line 1012 (Tx, transmitter) of the power supply module 1011. The cholesteric liquid crystal may receive a signal from the touch screen panel integrated circuit 1001 based on a reception line 1013 (Rx, receiver) of the power supply module 1011. According to various embodiments, the cholesteric liquid crystal may receive power from the touch screen panel integrated circuit 1001 included in the touch screen panel, and may reflect light such that a color corresponding to the supplied power is displayed.

Referring to FIG. 10B, a pattern and wiring structure 1020 of a touch screen panel (e.g., the display 101 in FIG. 1) configured to apply a voltage to a cholesteric liquid crystal corresponding to three colors is illustrated. The touch screen panel may include a touch screen panel integrated circuit (TSP IC) 1001, and may receive power from the touch screen panel integrated circuit (TSP IC) 1001. According to various embodiments, the cholesteric liquid crystal may be electrically connected to the touch screen panel integrated circuit 1001 via at least one power supply module 1021 (e.g., a power feeding terminal), and may receive power from the touch screen panel integrated circuit 1001. The cholesteric liquid crystal corresponding to three colors may include at least three cholesteric films 1033, 1035, and 1037, and may be connected to at least one power supply module 1021 corresponding to each cholesteric film. For example, the cholesteric liquid crystal may transmit a signal to the touch screen panel integrated circuit 1001 based on at least three transmission lines 1022 (Tx) of the power supply module 1021. The cholesteric liquid crystal may receive a signal from the touch screen panel integrated circuit 1001 based on a reception line 1023 (Rx) of the power supply module 1021. According to various embodiments, the cholesteric liquid crystal may receive power from the touch screen panel integrated circuit 1001 included in the touch screen panel, and may reflect light such that a color corresponding to the supplied power is displayed.

Referring to FIG. 10B, a cholesteric liquid crystal (e.g., at least one cholesteric film 1033, 1035, or 1037, at least one ITO film 1032, 1034, 1036, or 1038) may be disposed between the glass 103 land the PET film 1039 of the electronic device. The cholesteric liquid crystal may be formed in a structure in which cholesteric films 1033, 1035, and 1037 and ITO films 1032, 1034, 1036, and 1038 are laminated one by one. For example, a first cholesteric film 1033 may be disposed under the first ITO film 1032, and a second ITO film 1034 may be disposed under the first cholesteric film 1033. The second cholesteric film 1035 may be disposed under the second ITO film 1034, and the third ITO film 1036 may be disposed under the second cholesteric film 1035. According to the above-described sequence, the cholesteric films 1033, 1035, and 1037, and the ITO films 1032, 1034, 1036, and 1038 may be laminated one by one so as to form a cholesteric liquid crystal. According to various embodiments, in order to supply power to the cholesteric films 1033, 1035, and 1037, the cholesteric liquid crystal may have via holes fabricated between the cholesteric films 1033, 1035, and 1037. The via holes may correspond to a path for signal transmission, and a shielding layer may be disposed on the outer surface (external surface) so as to block noise for the signal transmission.

Figure 11:
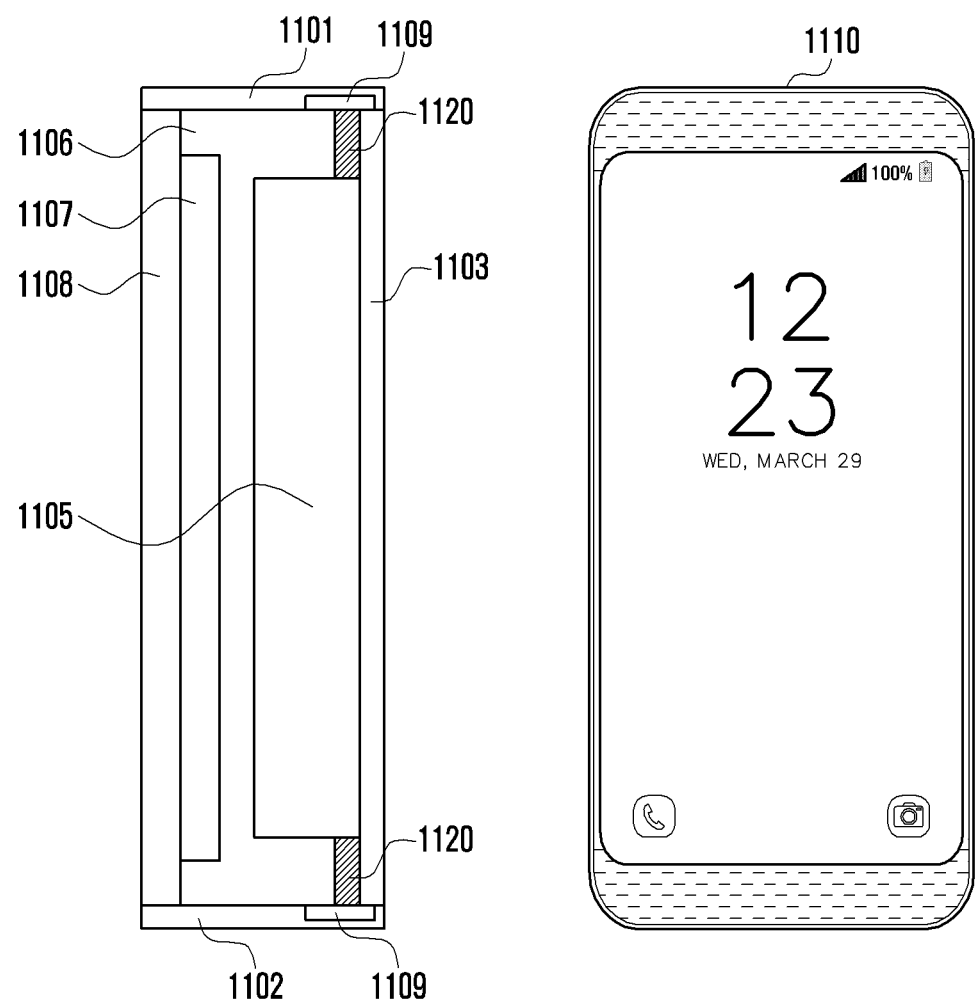
FIG. 11 is a view illustrating a structure for reducing noise of a signal radiated through an antenna according to various embodiments of the disclosure.

FIG. 11 is a view illustrating a structure for reducing noise of a signal radiated through an antenna according to various embodiments of the disclosure.

Referring to FIG. 11, a cross-sectional view corresponding to one surface of an electronic device 1110 (e.g., the electronic device 100 in FIG. 1) is illustrated. A display panel 1105 (e.g., the display 101 and the touch screen panel in FIG. 1 or the display 330 in FIG. 3) configured to display a screen may be disposed on the front surface of the electronic device 1110, and a piece of glass 1103 (e.g., the front glass) configured to protect the display panel 1105 may be disposed on one surface (e.g., the top surface) of the display panel 1105. A bracket 1106 (e.g., the first support member 311 in FIG. 3) configured to support the display panel 1105 may be disposed under the display panel 1105. A printed circuit board 1107 (e.g., the printed circuit board 340 in FIG. 3) may be disposed under the bracket 1106, and a piece of back glass 1108 (e.g., a piece of rear glass) may be disposed under the printed circuit board 1107 so as to protect the printed circuit board 1107. According to an embodiment, the front portion of the electronic device 1110 may be protected by the glass 1103, and the rear portion may be protected by the back glass 1108.

According to an embodiment, the electronic device 1110 may have antenna areas 1101 and 1102 corresponding to side portions (e.g., the side surface 110c in FIG. 1 and the side bezel structure 118 in FIG. 1), and signals may be radiated via the antenna areas 1101 and 1102. According to an embodiment, the electronic device 1110 may include a cholesteric liquid crystal 1120 configured to display at least one color in an area other than the area in which a screen is displayed (e.g., an area in which a screen is displayed on the front portion of the electronic device 1110 through the display panel 1005). For example, the cholesteric liquid crystal 1120 may receive a voltage and may reflect light such that at least one color is displayed in response to a set voltage.

According to various embodiments, noise may be generated from an antenna signal radiated through the antenna areas 1101 and 1102, and the electronic device 1110 may include an insulating layer 1109 (e.g., a slit structure) so as to block the noise. The insulating layer 1109 may be disposed between the antenna areas 1101 and 1102 and the cholesteric liquid crystal 1120. The cholesteric liquid crystal 1120 may block noise corresponding to the antenna areas 1101 and 1102 based on the insulating layer 1109.

An electronic device according to various embodiments may include: a piece of glass (e.g., the front plate 102 in FIG. 1); a display (e.g., the display 101 in FIG. 1) disposed under a first area of the glass 102; a power supply module (e.g., the power supply module 1011 in FIG. 10A); a light reflection member (e.g., a cholesteric liquid crystal) including one or more electrode films, and one or more liquid crystal layers disposed between the one or more electrode films, the light reflection member being disposed under a second area of the glass 102; a processor operatively connected to the display 101, the power supply module 1011, and the light reflection member; and a memory operatively connected to the processor. The memory may be configured to store instructions that, when executed, cause the processor to: identify a content to be displayed through the display 101; and supply power to the light reflection member using the power supply module 1011 in order to cause the one or more liquid crystal layers to reflect at least a part of light incident from an outside of the electronic device based on at least the identified content.

According to various embodiments, in the light reflection member, the one or more liquid crystal layers and the one or more electrode films may be laminated alternately one by one.

According to various embodiments, the processor may be configured to identify a voltage set to correspond to the identified content, and to supply the set voltage via the power supply module 1011.

According to various embodiments, the processor may be configured to cause at least a part of the light to be reflected based on the set voltage, and to determine a color of the light reflection member based on the reflected light.

According to various embodiments, the display 101 may include a touch screen panel, the touch screen panel may receive power from the power supply module 1011, and the power supplied to the touch screen panel may be supplied to the light reflection member.

According to various embodiments, the one or more liquid crystal layers may include a liquid crystal layer in which at least one liquid crystal molecule is twisted in a spiral shape, and reflection and transmission of incident light may be at least partially controlled depending on a spiral pitch.

According to various embodiments, in the one or more liquid crystal layers, the spiral pitch may be determined in response to the power supplied via the power supply module 1011, and at least a part of the incident light may be selectively reflected based on the spiral pitch.

According to various embodiments, the number of colors capable of being displayed may be determined based on the number of liquid crystal layers included in the light reflection member.

According to various embodiments, one or more power supply modules 1011 may be provided to correspond to the one or more liquid crystal layers, respectively, and the power may be supplied to the one or more liquid crystal layers based on the one or more power supply modules 1011.

According to various embodiments, a via hole may be configured between the one or more electrode films, and the one or more electrode films may be electrically connected based on the via hole.

The electronic device according to various embodiments may include a shield layer configured to correspond to an outer surface the via hole.

The electronic device according to various embodiments may further include an antenna (e.g., the antenna 370 in FIG. 3) configured to radiate an antenna signal, and an insulating layer and a slit structure may be disposed between the antenna 370 and the light reflection member in order to block noise.

An electronic device according to various embodiments may include a piece of glass 102, a display 101 disposed under a first area of the glass 102, a power supply module 1011, and a light reflection member disposed under a second area of the glass 102 corresponding to a remaining area other than the first area in the glass. The light reflection member may include one or more electrode films and one or more liquid crystal layers disposed between the one or more electrode films, power may be supplied to correspond to the one or more liquid crystal layers via the power supply module 1011, and at least a part of light incident from the outside of the electronic device may be reflected in response to the supplied power.

According to various embodiments, the light reflection member may be configured to reflect at least a part of the light based on the voltage of the supplied power, and a displayed color may be determined based on the reflected light.

According to various embodiments, the display may include a touch screen panel, the touch screen panel may receive power from the power supply module 1011, and the power supplied to the touch screen panel may be supplied to the light reflection member.

An electronic device according to various embodiments may include a piece of glass 102, a display 101 disposed under the glass 102, a power supply module 1011, and a light reflection member disposed between the glass 102 and the display 101. The light reflection member may include one or more electrode films and one or more liquid crystal layers disposed between the one or more electrode films, power may be supplied to correspond to the one or more liquid crystal layers via the power supply module 1011, and at least a part of light incident from the outside of the electronic device may be reflected in response to the supplied power.

An electronic device according to an embodiment may be one of various types of electronic devices. The electronic device may include a portable communication device (e.g., a smart phone), a computer device, a portable multimedia device, a portable medical device, a camera, a wearable device, or a home appliance. However, the electronic device is not limited to any of those described above.

Various embodiments of the disclosure and the terms used herein are not intended to limit the technological features set forth herein to particular embodiments and include various changes, equivalents, or replacements for a corresponding embodiment. With regard to the description of the drawings, similar reference numerals may be used to refer to similar or related elements. A singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). If an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

The term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a piece of glass;
a display disposed under a first area of the glass;
a power supply module;
a light reflection member comprising one or more electrode films, and one or more liquid crystal layers disposed between the one or more electrode films, the light reflection member being disposed under a second area of the glass;
a processor operatively connected to the display, the power supply module, and the light reflection member; and
memory operatively connected to the processor,
wherein the memory is configured to store instructions that, when executed, cause the processor to:
identify a content to be displayed through the display,
identify a set voltage corresponding to the identified content, and
supply the set voltage to the light reflection member using the power supply module in order to cause the one or more liquid crystal layers to reflect at least a part of light incident from an outside of the electronic device based on the identified content.

2. The electronic device of claim 1, wherein, in the light reflection member, the one or more liquid crystal layers, and the one or more electrode films are laminated alternately one by one.

3. The electronic device of claim 1, wherein the instructions cause the processor to:
cause at least a part of the light to be reflected based on the set voltage, and
determine a color of the light reflection member based on the reflected light.

4. The electronic device of claim 1, wherein the display comprises a touch screen panel,
the touch screen panel receives the set voltage from the power supply module, and the set voltage supplied to the touch screen panel is supplied to the light reflection member.

5. The electronic device of claim 1, wherein the one or more liquid crystal layers comprise a liquid crystal layer in which at least one liquid crystal molecule is twisted in a spiral shape, and reflection and transmission of incident light are at least partially controlled depending on a spiral pitch.

6. The electronic device of claim 5, wherein in the one or more liquid crystal layers, the spiral pitch is determined in response to the set voltage supplied via the power supply module, and at least a part of the incident light is selectively reflected based on the spiral pitch.

7. The electronic device of claim 1, wherein a number of colors capable of being displayed are determined based on a number of liquid crystal layers included in the light reflection member.

8. The electronic device of claim 1, wherein one or more power supply modules are provided to correspond to the one or more liquid crystal layers, respectively, and
the set voltage is supplied to the one or more liquid crystal layers based on the one or more power supply modules.

9. The electronic device of claim 1, wherein a via hole is configured between the one or more electrode films, and the one or more electrode films are electrically connected based on the via hole.

10. The electronic device of claim 9, wherein the via hole has a shield layer configured to correspond to an outer surface thereof.

11. The electronic device of claim 1, further comprising:
an antenna configured to radiate an antenna signal,
wherein an insulating layer and a slit structure are disposed between the antenna and the light reflection member in order to block noise.

12. An electronic device comprising:
a piece of glass;
a display disposed under a first area of the glass;
a power supply module; and
a light reflection member disposed under a second area of the glass corresponding to a remaining area other than the first area in the glass, wherein the light reflection member comprises one or more electrode films and one or more liquid crystal layers disposed between the one or more electrode films, wherein the light reflection member is supplied with a set voltage corresponding to a content to be displayed on the display using the power supply module, and wherein at least a part of light incident from an outside of the electronic device is reflected based on the light reflection member supplied with the set voltage.

13. The electronic device of claim 12, wherein the light reflection member is configured to reflect at least a part of the light based on the set voltage, and a displayed color is determined based on the reflected light.

14. The electronic device of claim 12, wherein the display comprises a touch screen panel, the touch screen panel receives the set voltage from the power supply module, and the set voltage supplied to the touch screen panel is supplied to the light reflection member.

* * * * *